United States Patent
Seetharaman et al.

(10) Patent No.: US 9,894,105 B2
(45) Date of Patent: Feb. 13, 2018

(54) METHOD AND SYSTEMS FOR IDENTIFYING FAULTY COMMUNICATION CALLS

(71) Applicants: Swaminathan Seetharaman, Chennai (IN); Kumar Ramadoss, Chennai (IN)

(72) Inventors: Swaminathan Seetharaman, Chennai (IN); Kumar Ramadoss, Chennai (IN)

(73) Assignee: WIPRO LIMITED, Bangalore (IN)

(*) Notice: Subject to any disclaimer, the term of this patent is extended or adjusted under 35 U.S.C. 154(b) by 115 days.

(21) Appl. No.: 14/748,143

(22) Filed: Jun. 23, 2015

(65) Prior Publication Data
US 2016/0277267 A1  Sep. 22, 2016

(30) Foreign Application Priority Data
Mar. 18, 2015  (IN) .......................... 1318/CHE/2015

(51) Int. Cl.
*H04M 15/00* (2006.01)
*H04L 29/06* (2006.01)
*H04M 3/22* (2006.01)

(52) U.S. Cl.
CPC ...... *H04L 65/1023* (2013.01); *H04M 3/2281* (2013.01); *H04M 15/41* (2013.01);
(Continued)

(58) Field of Classification Search
CPC .. H04L 65/1023; H04M 15/56; H04M 3/2281
See application file for complete search history.

(56) References Cited

U.S. PATENT DOCUMENTS 6,262,992 B1 * 7/2001 Nelson ................ H04M 15/00
  370/395.1
7,106,843 B1 * 9/2006 Gainsboro .......... H04M 3/2281
  379/191
(Continued)

FOREIGN PATENT DOCUMENTS

EP  2400961 A1  12/2011

OTHER PUBLICATIONS

Extended European search report from the European Patent Office for counterpart European Application No. EP 15 20 2437 dated Aug. 18, 2016.
(Continued)

*Primary Examiner* — Noel Beharry
*Assistant Examiner* — Richard Schnell
(74) *Attorney, Agent, or Firm* — Finnegan, Henderson, Farabow, Garrett & Dunner, LLP

(57) ABSTRACT

This disclosure relates generally to call monitoring techniques, and more particularly to method and system for identifying faulty communication calls. In one embodiment, a method comprises generating communication call record information for a communication call upon determining release of the communication call on a signaling plane. The method further comprises receiving a notification that media plane resources are still active after release of the communication call on the signaling plane. The method further comprises requesting for and receiving media activity of the communication call on the media plane in response to active media plane resources. The method further comprises identifying the faulty communication call based on the communication call record information and the media activity of the communication call.

20 Claims, 4 Drawing Sheets

(52) U.S. Cl.
CPC ......... *H04M 15/70* (2013.01); *H04M 15/725* (2013.01); *H04M 15/73* (2013.01); *H04M 15/74* (2013.01); *H04M 15/56* (2013.01)

(56) References Cited

U.S. PATENT DOCUMENTS

| | | | |
|---|---|---|---|
| 7,751,384 B1* | 7/2010 | Paterik | H04L 12/66 370/352 |
| 9,374,848 B1* | 6/2016 | Jayaraman | H04W 76/064 |
| 2005/0047566 A1 | 3/2005 | Moisey et al. | |
| 2005/0207548 A1* | 9/2005 | Moore | H04M 3/5158 379/112.1 |
| 2006/0045102 A1 | 3/2006 | Pelaez et al. | |
| 2009/0180390 A1* | 7/2009 | Lin | H04L 29/06027 370/252 |
| 2010/0275069 A1* | 10/2010 | Lin | H04L 65/1043 714/48 |
| 2011/0268128 A1* | 11/2011 | Aberg | H04L 12/24 370/401 |
| 2012/0178413 A1* | 7/2012 | Schliesser | H04L 12/14 455/406 |

OTHER PUBLICATIONS

International Telecommunications Union—Telecommunication Standardization Sector of ITU—ITU-T H.243.1; Gateway Control Protocol: Version 3; Series H: Audiovisual and Multimedia Systems Infrastructure of Audiovisual Services—Communication Procedures; dated Mar. 2013 (pp. i-v and 1-232).

International Telecommunications Union—Telecommunication Standardization Sector of ITU—ITU-T H.248.36; Gateway Control Protocol: Hanging Termination Detection Package; Series H: Audiovisual and Multimedia Systems Infrastructure of Audiovisual Services—Communication Procedures; dated Mar. 2013 (pp. i-iii and 1-5).

* cited by examiner

METHOD AND SYSTEMS FOR IDENTIFYING FAULTY COMMUNICATION CALLS

PRIORITY CLAIM

This U.S. patent application claims priority under 35 U.S.C. § 119 to: India Application No. 1318/CHE/2015, filed Mar. 18, 2015. The entire content of the aforementioned application is incorporated herein by reference.

TECHNICAL FIELD

This disclosure relates generally to call monitoring techniques, and more particularly to method and systems for identifying faulty communication calls.

BACKGROUND

Digital communication has revolutionized telephone networks. One particular aspect, Voice over Internet Protocol (VoIP), has provided increased efficiency and quality for real-time voice communications. VoIP utilizes protocols to initiate and control call parameters.

In the VOIP network, a Media Gateway Controller (MGC) performs functions such as session setup, routing of the call, billing, initiation of lawful interception, etc. The MGC is responsible to capture and transmit accurate information related to the call which is relevant for charging of the call to the billing system. The information includes call/session setup notification, call/session teardown notification, bandwidth and media resources used for the call, etc. All these information in turn, would enable the billing system to determine the amount to be charged to the user for the call.

For some reason, if the call is torn down only on the signaling plane i.e., in the MGC and not on media plane i.e., in the Media Gateway (MGW), it could lead to faulty/unauthorized communication, unaccounted resource utilization and results into significant undercharging for the call. This is because the calling and called users will be actually communicating with each other after the call was torn down on the signaling plane.

One of the existing technique is to detect hanging terminations in the MGW by the MGC i.e., media plane terminations that are still active for a call whose signaling plane resources have been cleared. The mechanism also discloses cleaning up of hanging resources in the MGW. However, the periodicity of such resource clean up cannot be too frequent as it may add to the overhead of the MGW, and also adds an overhead on the network traffic. In some cases, the periodicity is set to typically ten minutes or higher, which still fails to resolve the undercharging issue for the faulty/unauthorized communication.

Another technique to ascertain if the media plane resources for a call are still active is by sending a periodic audit request to the MGW by the MGC to know the usage status of media plane resources in the MGW. However, it is impractical to perform frequent audits for all the media terminations in the MGW due to the computation/processing overhead in the MGW and the MGC, as well as the signaling overhead i.e., overhead in network traffic involved. So, the MGC typically requests the MGW to perform an audit for a subset of media plane resources on a rotational basis during each audit interval. An audit interval would be typically an hour, so it may take an hour or longer for auditing the particular media resources that were involved in the faulty/unauthorized communication. So, this mechanism still fails to resolve the undercharging issue for the faulty/unauthorized communication Even if there are active resources in a faulty/unauthorized communication, it cannot be concluded by the MGW as such whether the user was still engaged in the communication. Further, the duration and resource usage by the users in a faulty/unauthorized communication cannot be determined by the current mechanism in MGW/MGC.

Therefore, the present techniques do not provide for determining whether the calling and called users were involved in faulty/unauthorized communication in a torn-down call. The call information is thus inadequate in the call record for the billing system to arrive at an accurate charging for the call.

SUMMARY

In an embodiment, a method for identifying faulty communication call is disclosed. The method comprises generating, by the media gateway controller, communication call record information for a communication call upon determining release of the communication call on a signaling plane, receiving a notification regarding active media plane resources of the communication call after the release of the communication call on the signaling plane, receiving media activity of the communication call on the media plane, wherein the media activity of the communication call is received upon a request from the media gateway controller in response to active media plane resources, and identifying the faulty communication call based on the communication call record information and the media activity of the communication call.

In an embodiment, a media gateway controller for identifying faulty communication call is disclosed. The media gateway controller comprises a processor and a memory communicatively coupled to the processor. The memory stores processor-executable instructions, which, on execution, causes the processor to generate communication call record information for a communication call upon determining release of the communication call on a signaling plane, receiving a notification regarding active media plane resources of the communication call after the release of the communication call on the signaling plane, receive media activity of the communication call on the media plane, wherein the media activity of the communication call is received upon a request from the media gateway controller in response to active media plane resources, and identify the faulty communication call based on the communication call record information and the media activity of the communication call.

In an embodiment, a non-transitory computer readable medium is disclosed. The medium includes instructions stored thereon that when processed by at least one processor cause a media gateway controller to perform operations comprising generating communication call record information for a communication call upon determining release of the communication call on a signaling plane, receiving a notification regarding active media plane resources of the communication call after the release of the communication call on the signaling plane, receiving media activity of the communication call on the media plane, wherein the media activity of the communication call is received upon a request from the media gateway controller in response to active media plane resources, and identifying the faulty communication call based on the communication call record information and the media activity of the communication call.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
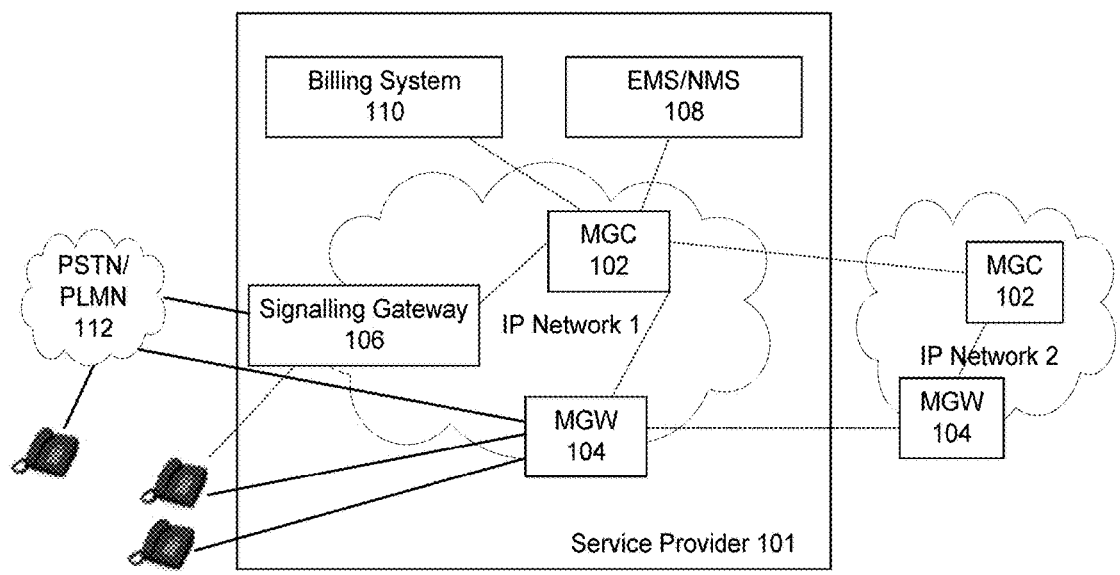
FIG. 1 illustrates an exemplary network overview of VOIP network according to some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Illustrative embodiments of the present disclosure are listed below. In one embodiment, system for identifying faulty communication call is described. In another embodiment, process for identifying faulty communication call is described. In an embodiment, a computer system is disclosed which may carry out disclosed processes. The disclosed systems and processes may be used in conjunction or applied separately without limitation.

FIG. 1 illustrates an exemplary network overview of VOIP network according to some embodiments of the present disclosure. The network overview comprises a system 100, which may include service provider 101 and other network connections. In an embodiment, service provider 101 may include at least one media gateway controller (MGC) 102 and media gateway (MGW) 104. The service provider 101 further comprises a signaling gateway 106, an Element Management System/Network Management System (EMS/NMS) 108 and a billing system 110.

As depicted, service provider 101 includes improved MGC 102 and improved MGW 104. The improved MGC 102 and improved MGW 104 may provide standard gateway controller and gateway functionality, respectively.

The network setup enable multimedia communications across Next Generation Networks over multiple transport protocols such as Asynchronous Transfer Mode (ATM) and Internet Protocol (IP). The MGC performs functions such as session setup, routing of communication call, billing, initiation of lawful interception, etc. The MGC 102 is responsible to capture and transmit accurate information related to the communication call, which are relevant for charging of the call to the billing system 110. The information includes, but is not limited to, call/session setup notification, call/session teardown notification, bandwidth and media resources used for the call etc. The information, in turn, would enable the billing system 110 to determine the amount to be charged to the user for the call.

As an example, the MGW 104 captures and reports relevant information to the MGC 102 to enable the MGC 102 to accurately determine the charging for the call. The MGC 102 determines whether the calling and called users were actually involved in communication after the tearing down of a communication call on the signaling plane but not on the media plane. Also, the MGC 102 determines the duration for which the users were involved in such a communication and provides such information to the billing system 110 in order for the billing system 110 to determine accurately the charging for the communication call.

The signaling gateway 106 is a network component responsible for transferring signaling messages including, but not limited to, information related to call establishment, billing, location, short messages, address conversion, and other services between nodes that communicate using different protocols and transports. In the illustration, the signaling gateway 106 transfers signaling messages between the MGC 102 and external network like Public Switched Telephone Network (PSTN)/Public Land Mobile Network (PLMN) 112.

The EMS/NMS 108 manages network elements of the telecommunications network. As an example, the elements which can be managed by EMS/NMS 108 include, but are not limited to, media gateway, soft switch etc.

Figure 2:
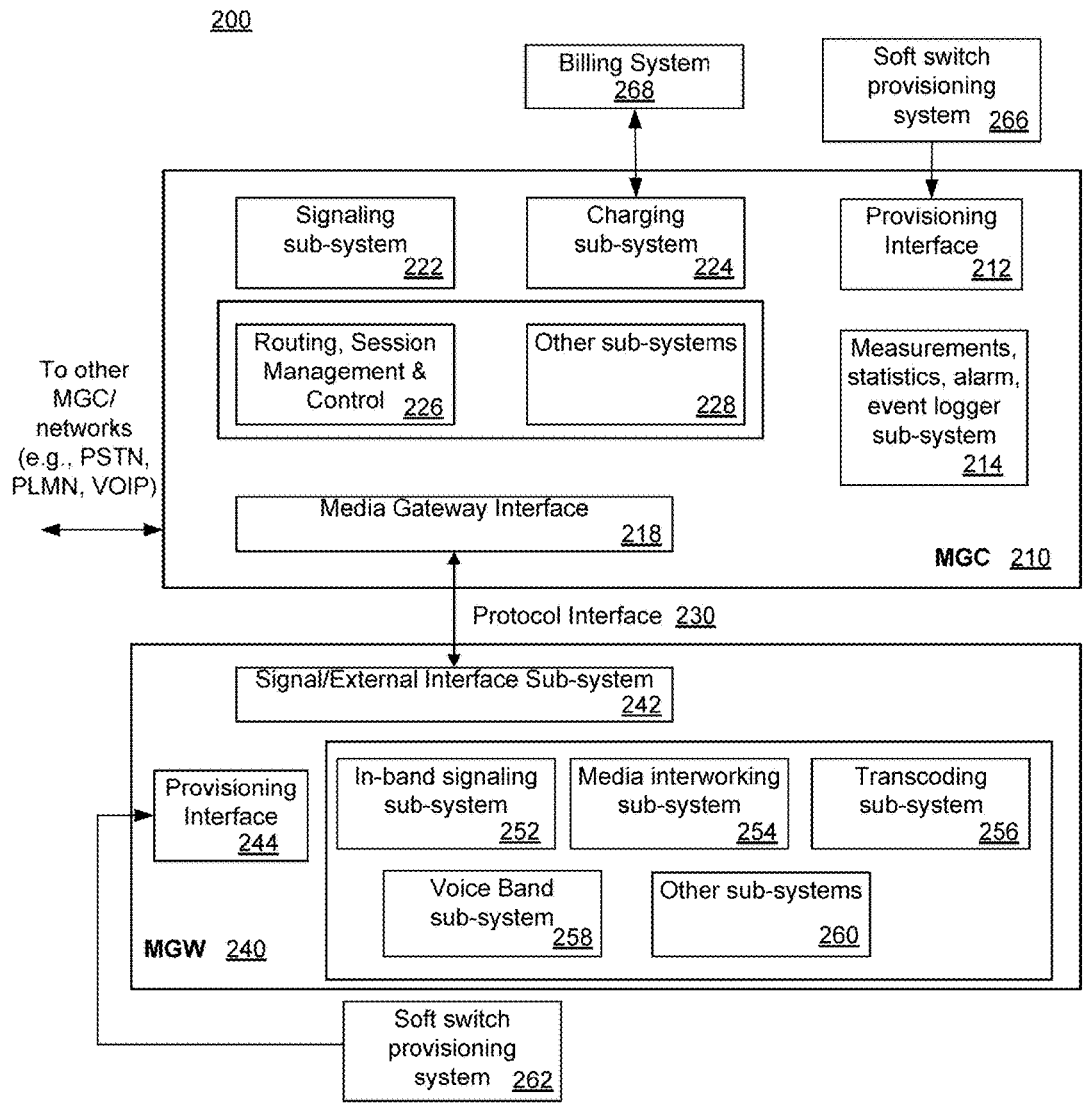
FIG. 2 is a functional block diagram according to some embodiments of the present disclosure.

FIG. 2 is a functional block diagram according to some embodiments of the present disclosure. System 200 may be implemented as part of system 100. System 200 includes MGC 210 and MGW 240. MGC 210 and MGW 240 are modified from standard media gateways and gateway controllers to accommodate identification of faulty communication call.

The billing system 268 and soft switch provisioning system (EMS/NMS) 266 are described in FIG. 1. In an embodiment, MGC 210 may include various sub-systems to perform the objects of this disclosure. As depicted, MGC 210 may include provisioning interface 212, measurements, statistics, alarm, event logger sub-system 214, signaling sub-system 222, charging sub-system 224, routing, session management and control (RSMC) 226, other sub-systems 228, and media gateway interface 218. Additional sub-systems may be used to perform disclosed processes. These sub-systems may be discrete units or combined into fewer separate sub-systems. The sub-systems may be made of discrete circuitry or processors, or programmable applications which run on hardware.

Provisioning interface 212 may interact with the external provisioning systems, such as Element Management Systems (EMS)/Network Management Systems (NMS) 108. In an embodiment, provisioning interface 212 may communicate with soft switch provisioning system 266. Provisioning interface 212 may make updates to copies of provisioned data in MGC 210 and may pass information to the necessary sub-systems, so that the provisioned data may be used by different sub-systems.

Measurements, statistics, alarm, event logger sub-system 214 is responsible for all measurements and statistics related to the sessions handled by the softswitch, external interfaces and info exchange with external nodes, availability times, critical and major events (e.g., IP network connectivity down for a sub-net, a MGW out of service, a particular sub-system down, etc.). It interacts with other sub-systems to obtain all the required info, and passes aggregated info to the EMS/NMS 108 through a standard or proprietary interface. In addition to its existing functions, sub-system 214 performs one or more functions. One function may be to provide indication of any alarm or event relevant to the analysis of media activity by the charging subsystem 224 for a call after the call has been torn down in the MGC 210. This indication is provided upon receiving request from the charging subsystem 224. It also provides relevant stored data about the termination and/or the users involved in the call.

Media gateway interface 218 may process communication with external systems for MGC 210. In an embodiment, media gateway interface 218 may handle protocol messages, associated signalling state machines and interactions with MGW 240. In addition to the existing functions, media gateway interface 218 sends an instruction to the MGW 240 to perform one or more functions. One function may be to capture and store relevant information about the media activity till the media termination and associated resources are cleared in the MGW 240 for that call. Another function may be to send a notification to the MGC 210 if no message exchange happened between the MGC 210 and the MGW 240 for a pre-defined time interval for that media termination.

When a message from the MGW 240 is received about media terminations for which no message interaction happened between MGC 210 and MGW 240 for a pre-defined duration, the media gateway interface 218 requests for additional media activity information for the terminations associated with communication calls which have been already cleared in the MGC 210.

When additional media activity information is received from the MGW 240 in response to the request for the media terminations associated with calls which have been already torn down in the MGC 210, the media gateway interface 218 passes on such information to the charging subsystem 224 in the MGC 210.

Signaling sub-system 222 may manage signaling protocol process for MGC 210. For example, signaling sub-system 222 may monitor and control signaling state machines and protocol function handling for various call-setup signalling interfaces to other MGCs, SIP nodes and other networks (e.g., VOIP, PSTN, PLMN).

RSMC 226 may perform call control processes. In an embodiment, RSMC 226 may be responsible for set-up and tear-down of a call session. RSMC 226 may control routing of the call to the proper destination and triggering other sub-systems, such as charging sub-system 224.

Charging sub-system 224 may provide billing services and process charges associated with call services. In an embodiment, charging sub-system 224 may process call charges. For example, charging sub-system 224 may collect information, such as call data records, and transport the call data records to a Business Support Sub-system (BSS) periodically over standard or proprietary interfaces. In addition to the existing functions, this sub-system performs one or more functions. Charging sub-system 224 receives media activity information from media gateway interface 218 for media terminations associated with calls which have already been torn down in the MGC 210. Then, it performs a detailed analysis to determine if the calling and called users were involved in the communication after the call was torn down and charging was stopped for the call in the MGC 210.

As an outcome of the analysis, if the charging subsystem 224 determines that the calling and called users communicated after the call was torn down in the MGC 210, the charging subsystem 224 prepares and sends a new add-on call record to billing system 268 for the call. For this, the charging subsystem 224 retains the call record information for calls that are already torn down on the MGC 210 for a predefined duration.

The charging subsystem 224 also passes relevant analysis outcome info to measurements, statistics, alarm, event logger sub-system 214 for future analysis. The analysis outcome information may include, but is not limited to, particular media termination involved in the call, info regarding the users involved in the call, any DTMF activity in the call etc.

Other sub-systems 228 may represent other sub-systems that may be present in MGC 210. These sub-systems may not be used in disclosed processes.

System 200 may include MGW 240. In an embodiment, MGW 240 may include various sub-system for implementing disclosed processes. As depicted, MGW may include Signaling/External Interface Sub-system (SEIS) 242, provisioning interface 244, in-band signaling sub-system (IBSS) 252, media interworking sub-system 254, transcoding sub-system 256, voice band sub-system (VBS) 258, and other sub-systems 260. Additional sub-systems may be used to perform disclosed processes. These sub-systems may be discrete units or combined into fewer separate sub-systems. The sub-systems may be made of discrete circuitry or processors, or programmable applications which run on hardware.

Provisioning interface 244 may provide provisioned data to sub-systems of MGW 240. In an embodiment, provisioning interface 244 may interact with MGW provisioning system 262 to update provisioned data. For example, provisioning interface 244 may update copies of provisioned data in MGW 240 and pass information to the necessary sub-systems, so that the provisioned data may be used by different sub-systems.

SEIS 242 may process communication with external systems for MGW 240. In an embodiment, SEIS 242 may handle protocol messages, associated signalling state machines, and interactions with MGC 210. The functions of SEIS 242 include detection of potential hanging terminations based on expiry of timer during which no interaction has taken place between MGC 210 and MGW 240. In addition to these functions, SEIS 242 receives an instruction by the MGC 210 to capture relevant media activity information, and to send a notification to the MGC 210 if no message exchange happened between MGC 210 and MGW 240 for a pre-defined time interval for a media termination. Upon receiving the instruction, SEIS 242 passes the relevant parts of the instruction to the Media Interworking Subsystem (MIS) 254 in the MGW 240. SEIS 242 handles new request from the MGC 210 to provide additional information on what happened/happening in the media path for the communication call that had been torn down earlier on the signaling plane and passes the request to the MIS 254 in the MGW 240. On receiving relevant information from MIS 254, SEIS 242 includes all relevant information in an appropriate format in the response message to the MGC 210.

Based on the instruction from the MGC 210, SEIS 242 is also responsible for sending notification message to MGC 210 when there is no message exchanged between MGC 210 and MGW 240 for a specific media termination for a predefined time interval.

Media interworking sub-system 254 may translate media between networks. In an embodiment, MGW 240 may receive media from various networks, such as PSTN and IP networks. Media interworking sub-system 254 may interwork media between different networks. For example, media interworking sub-system 254 may interwork media between a PSTN network (e.g., E1/T1 connections) and an IP network (e.g., Real-time Transport Protocol (RTP)); between two PSTN networks (e.g., PSTN hairpinning); and/or between two IP networks (e.g., IP hairpinning). MIS 254 possesses the capability to detect RTP inactivity on the media plane between the media terminations involved in the call. In addition to these functions, MIS 254 performs one or more functions. Based on media activity information collected, MIS 254 analyzes and determines the time at which the last valid media exchange happened between the calling and called users, denoting an active communication between the two users. For determining this, MIS 254 excludes RTP packets that contain only comfort noise, parked tone or any other tone which do not constitute an active communication between the calling and called user. In other words, it can be viewed as an enhanced RTP inactivity detection mechanism for determining the time of last valid media activity between the calling and called user.

MIS 254 also captures and stores what happened since the last notification to MGC 210, what happened as well as what is currently happening (and since when) in the media path. For example, comfort noise, tone playing, uni-directional media flow, bi-directional communication, etc. The storage of such information lasts till the particular media termination and associated resources are cleared for that call.

When requested for a particular termination, MIS 254 informs SEIS 242 of the time of last valid media exchange between the calling and called users, and what is being currently transferred on the media path. The currently transferred information can be RTP, tone, comfort noise, uni-directional media flow, bi-directional communication etc., and other relevant status information of the media exchange like in case of uni-directional media flow, when did the uni-directional flow start, RTP inactivity timer's elapsed duration, if the valid media exchange between the calling and called user is still ongoing, etc.

Transcoding sub-system 256 may handle codecs for MGW 240. In an embodiment, transcoding sub-system 256 may work with media interworking sub-system 254. For example, transcoding sub-system 256 may provide the codecs necessary to transcode media for two different networks.

IBSS 252 may provide in-band signaling operations. In an embodiment, IBSS 252 may detect DTMF digits and multi-frequency tones. For example, IBSS 252 may process incoming audio data to identify DTMF digits in captured audio. IBSS 252 may also collect digits and perform digit pulsing. In an embodiment, IBSS 252 may also handle the generation of specialized packet formats to indicate DTMF digits. IBSS 252 may pass the DTMF information to SEIS 242 for improved notification to MGC 210.

VBS 258 may provide functions to process voice audio. In an embodiment, VBS 258 may receive audio data including voices. VBS 258 may perform echo cancellation, jitter handling, fax transmission processing (e.g., T.38, voice-band fax), media inactivity detection, and comfort noise generation. For example, during a call, VBS 258 may generate a comfort tone for a caller and remove background noise. In an embodiment, VBS 258 may provide in-band voice analysis for DTMF dialing.

Other sub-systems 260 may represent other sub-systems that may be present in MGW 240. These sub-systems may or may not be used in disclosed processes. System 200 may include additional interfaces and network connections (not depicted) to interface with different networks.

Figure 3:
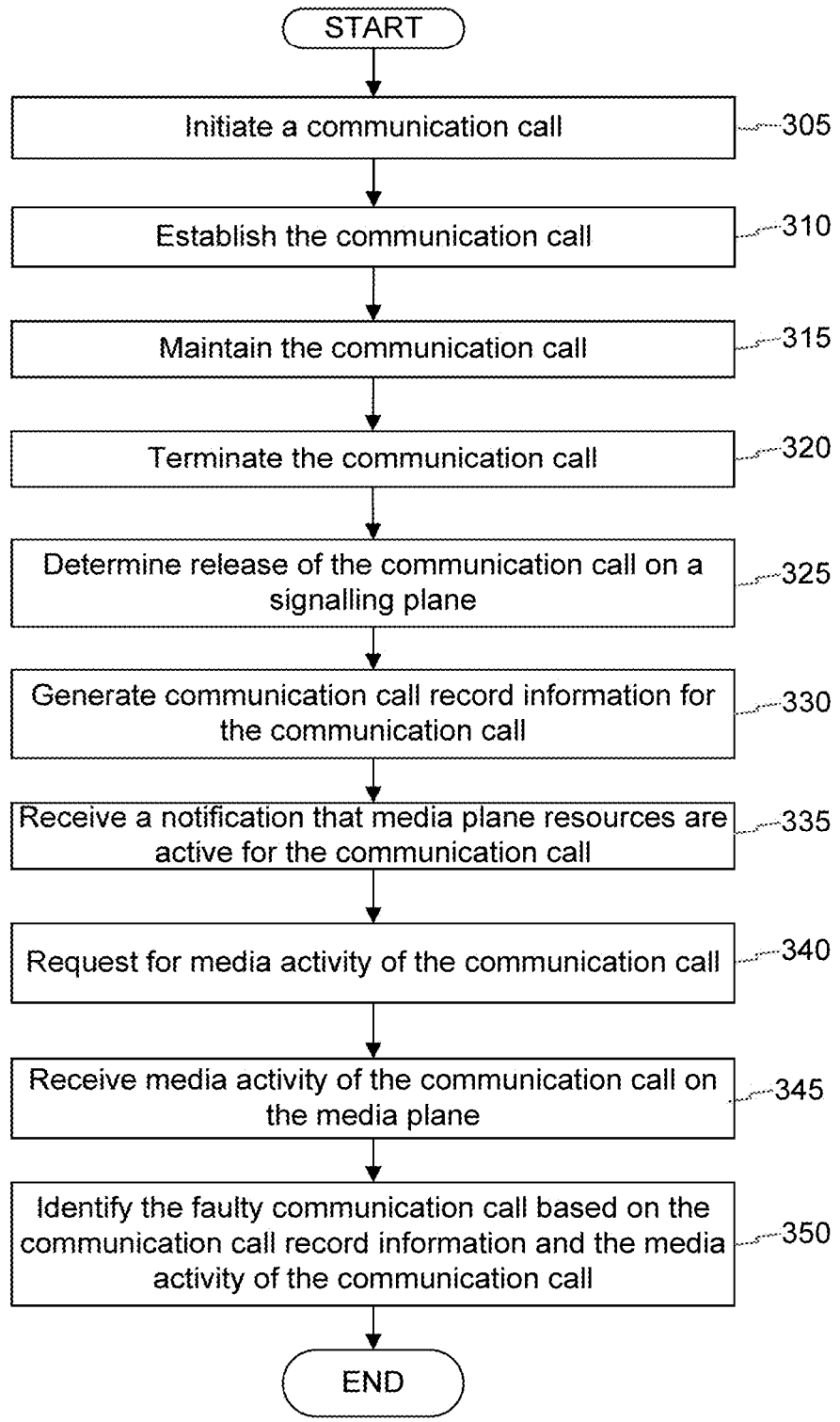
FIG. 3 is a flow diagram illustrating for identifying faulty communication call in accordance with some embodiments of the present disclosure.

FIG. 3 is a flow diagram illustrating a method for identifying faulty communication call in accordance with some embodiments of the present disclosure. Process 300 may be performed using various components of system 100 and system 200. While the process may be described as being performed by specific components, it may be understood that other components may be used to perform the same or equivalent functions.

A communication call process is illustrated in FIG. 3. First, at step 305, a communication call is initiated. MGC 210 receives a request from the calling user to setup a call to the called user. The request may be received directly from the user or via the signaling gateway 106 or from another MGC 210. The different sub-systems in MGC 210 e.g., RSMC 226, signaling sub-systems 222 allocate required resources for handling the call.

Firstly, instruction for resource allocation in MGW 240 is generated by MGC 210. The Media Gateway Interface sub-system 218 in MGC 210 instructs SEIS 242 in MGW 240 to allocate resources required for the call. The instruction also includes a command to the SEIS 242 in the MGW 240 to periodically report the status of resources used for the call. Further, the instruction includes a command to capture, analyze and store relevant media activity information.

Next, MGW 240 allocates resources. Upon receiving an instruction from the MGC 210 to allocate resources for the call, different sub-systems in MGW 240 e.g., transcoding sub-system 256, media interworking sub-system 254 and in-band signaling sub-system 252 allocate the resources needed for handling the call. Such resources could be codecs for encoding/decoding the media packets, echo cancellation resources, DTMF detection, etc.

Based on the instruction received from MGC 210, SEIS 242 in MGW 240 initiates periodic monitoring of the status of resources used for the call. The Media Interworking Sub-system 254 in MGW 240 initiates collection and analysis of media plane activity in the call Then, MGC 210 triggers a confirmation to be sent to the calling user upon receiving a confirmation that the called user has been reached. Such a confirmation could be sent as a signaling message to the switch neighboring to MGC 210, or sent as ringback tone in the media path to the calling user. In case of the former, the signaling subsystem 222 sends a signaling message (e.g., a SIP 180 Ringing message or an SS7 ISUP ACM message), e.g., to the signaling gateway 106 or to a neighboring MGC 210 backwards. In case of the latter, the Media Gateway Interface subsystem 218 in the MGC 210 instructs the MGW 240 to connect or pass-through the ringback tone in the media path to the calling user.

Next, the charging subsystem 224 in MGC 2120 initiates a call record to be prepared upon receiving confirmation that the called user has been reached. The call record comprises information including, but not limited to, calling user, called user, timestamp of receiving the confirmation that the called user has been reached and the media resources used for the call.

In step 310, the communication call is established. MGC 210 receives confirmation that the called user has gone off-hook i.e., answered the call. Then, signaling sub-system 222 in MGC 210 requests the Media Gateway Interface sub-system 218 in MGC 210 to instruct MGW 240 to set up bi-directional communication on the media path. The Media Gateway Interface sub-system 218 in MGC 210 accordingly instructs MGW 240 to set up bi-directional communication for the call on the media path between the calling and called users.

Subsequently, charging subsystem 224 starts charging for the communication call. In an embodiment, the charging subsystem 224 in the MGC 210 simply writes the timestamp of reception of confirmation that the called user has answered the call in the initiated call record. It also writes the service usage and media resource usage in the call record.

In step 315, the communication call is maintained. The RSMC 226 together with signaling subsystem 222 and Media Gateway Interface sub-system 218 in MGC 210 monitors the resources used in MGC 210 for the call. Similarly, SEIS 242 in MGW 240 monitors the resources used in MGW 240 for the call. If there is no message exchanged between MGC 210 and MGW 240 for a pre-determined duration, the SEIS 242 sends a notification to the Media Gateway Interface sub-system 218 in the MGC 210 that the resources for the call are still active i.e., not cleared in the MGW. The pre-determined duration would be typically e.g., 10 minutes or even higher in some cases or maybe slightly lower in a very few cases. While it is normal to have this duration to be much greater than the average call holding time, the exact pre-determined duration could be specified by the operator depending on factors such as the operator's preferences, frequency of occurrence of incidents involving hanging media resources in the MGW 240). Upon receiving such a notification from the SEIS 242 in the MGW 240, the Media Gateway Interface sub-system 218 in the MGC 210 sends an acknowledgement to the SEIS 242 that the call is still ongoing, and the resources in MGC 210 are also active for the call. MIS 254 in MGW 240 also collects relevant media activity information for the call, performs analysis and stores the outcome.

Then, the call record is updated. The charging subsystem 224 periodically updates the call record for the call with information such as duration for which the call has been active and any relevant information that would be useful to billing system 268 to determine the charge for the call. The charging subsystem 224 also updates the call record when any event relevant to charging of the call occurs. Such event include, but are not limited to, change in bandwidth or media resources needed for the call, invocation of any mid-call feature or service, etc.

At step 320, the communication call is terminated by the user. At step 325, the release of communication call on the signaling plane is determined. MGC 210 receives call termination trigger from signaling gateway 106. The MGC receives a trigger to terminate the call from one of the users involved in the call, via the signaling gateway 106 or from a neighboring MGC 210. Upon receiving the release trigger, different sub-systems in MGC 210 are triggered by the signaling subsystem 222 to clear the resources allocated for the call.

At step 330, a communication call record is generated for the communication call. Upon receiving information from the signaling subsystem 222 that the call has been released, charging sub-system 224 updates the call record with information such as call duration (in terms of absolute duration or in terms of metering pulse count), call release timestamp, reason for the release, etc. The charging subsystem 224 then closes the call record and writes it into a storage medium such as a hard-disk. The details of the call record are retained in the charging subsystem 224 for a predefined duration, to enable including relevant information in add-on call record. In an embodiment, the predefined duration may be greater by a few minutes, for example 7 minutes greater than the pre-determined duration (explained in step 315) after which MGW 240 sends a notification to MGC 210, if there was no message exchanged between MGC 210 and MGW 240 during the pre-determined duration.

The charging sub-system 224 then sends the call record to the billing system 268. The billing system 268 may be a billing mediation system which then converts the call record into a suitable format that is understood by the Business Support System (BSS). In an embodiment, charging subsystem 224 may send the call record to the billing system 268 soon after the call is over, or send a bunch of closed call records periodically (e.g., once every hour).

At step 335, SEIS 242 in MGW 240 sends a notification to the Media Gateway Interface sub-system 218 in MGC 210 that the resources for the call are still active in MGC 210. In an embodiment, if there is no message exchanged between MGC 210 and MGW 240 for a pre-determined duration (explained in step 315), SEIS 242 sends a notification to the Media Gateway Interface sub-system 218 in the MGC 210 that the resources for the call are still active i.e., not cleared in the MGW.

In step, 340, the Media Gateway Interface 218 in the MGC sends an instruction to the SEIS 242 in MGW 240 requesting for media plane activity for the communication call. The request from MGC 210 also includes the timestamp when the communication call was released by MGC 210 on signaling plane level. The SEIS 242 in MGW 240 passes this request from the MGC 210 towards the MIS 254 in the MGW 240.

At step 345, MGC 210 receives media plane activity information for the call based on the request in step 340. In an embodiment, upon receiving request for media plane activity for the call from the SEIS 242 in the MGW 240, the MIS 254 in the MGW 240 informs SEIS 242 in the MGW 240 of one or more information. The one or more information includes, but is not limited to, time of last valid media exchange between the calling and called users, what is being currently transferred on the media path (excluding RTP, tone, comfort noise, uni-directional media flow, bi-directional communication etc.), and other relevant info (for e.g., in case of uni-directional media flow—when did the uni-directional flow start, RTP inactivity timer's elapsed duration, if the valid media exchange between the calling and called user is still ongoing, etc.). The SEIS 242 in the MGW 240 converts this information received from the MIS 254 in the MGW 240 into a suitable format and sends it to the MGI 218 in the MGC 210. Upon receiving media plane activity information for the call, MGI 218 in the MGC 210 instructs the SEIS 242 in the MGW 240 to clear the resources in the MGW 240 associated with the call.

In step 350, a faulty communication call is identified. In an embodiment, MGC 210 determines if the communication between the calling and called users continued beyond the release of signaling plane resources.

The charging subsystem 224 in MGC 210 performs an analysis to determine if the calling and called users were actually involved in communication after the call was torn down by the MGC 210. One set of parameters considered for determination are the media activity information received from the MGW 240 via the MGI 218 in MGC 210. The media activity information comprises timestamp of last valid media exchange excluding comfort noise, parked tone or any tone that do not constitute a communication between calling and called users. The media activity information also comprises what is being currently transferred on the media path excluding RTP, tone, comfort noise, uni-directional media flow, bi-directional communication, etc., and other relevant information. The other relevant information includes, but is not limited to, in case of uni-directional media flow—when did the uni-directional flow start, RTP inactivity timer's elapsed duration, if the valid media exchange between the calling and called user is still ongoing, etc.

Another set of parameters considered for determination are information about the call that is available within the call record and associated call information like whether the call ended with an announcement, etc.

Another set of parameters considered for determination are information available with the measurements, statistics, alarm, event logger subsystem 214. The information may include any disconnection, outage, alarm or congestion event related to MGW 240 that was reported at the time the call was torn down at the MGC 210. The information may also include any disconnection, outage, alarm or congestion event related to an external announcement server that was reported at the time the call was torn down at MGC 210, if the call was terminated by MGC 210 during or soon after an announcement was played.

Another set of parameters considered for determination are information about the call that is present in the MGC 210. For e.g., whether any DTMF digits were dialed just before the call was torn down by MGC 210.

Another set of parameters considered for determination are historical data about the media termination, as well as the users involved in the call. This data is provided by the measurements, statistics, alarm, event logger subsystem 214 in the MGC 210.

Upon determining that the calling and called users were involved in communication after the call was torn down by the MGC 210, the charging subsystem 224 determines the duration of such communication, and the media resources used during that period of communication.

In an embodiment, an add-on communication call record information is generated for the call record information. The charging subsystem 224 generates an add-on call record for the call, and updates it with all relevant information such as the timestamp of actual release of the call on media plane, reason for release of media plane resources (forced release by MGC), media resources used (beyond the time at which the call was torn down in the MGC) and charging related information. In addition, the charging subsystem 224 also includes a reference/link to the call record that was generated and sent to the billing system 268 earlier for this call, in this add-on call record. The charging subsystem 224 then closes the add-on call record and writes it into a storage medium such as a hard-disk. Further, the add-on communication call record information is sent to the billing system 268. The call record information that was retained earlier in the charging subsystem 224 is then cleared.

The charging subsystem 224 informs the measurements, statistics, alarm, event logger subsystem 214 about the users involved in the call, the media terminations in the MGW 240 and whether the users were involved in actual communication beyond the time the call was torn down in MGC 210. The reason for the media plane resources not cleared when the call was torn down in MGC 210 as determined by the charging subsystem 224 is also sent to measurements, statistics, alarm, event logger subsystem 214. The measurements, statistics, alarm, event logger subsystem 214 stores all information received for future use in determining faulty/unauthorized communication calls.

Computer System

Figure 4:
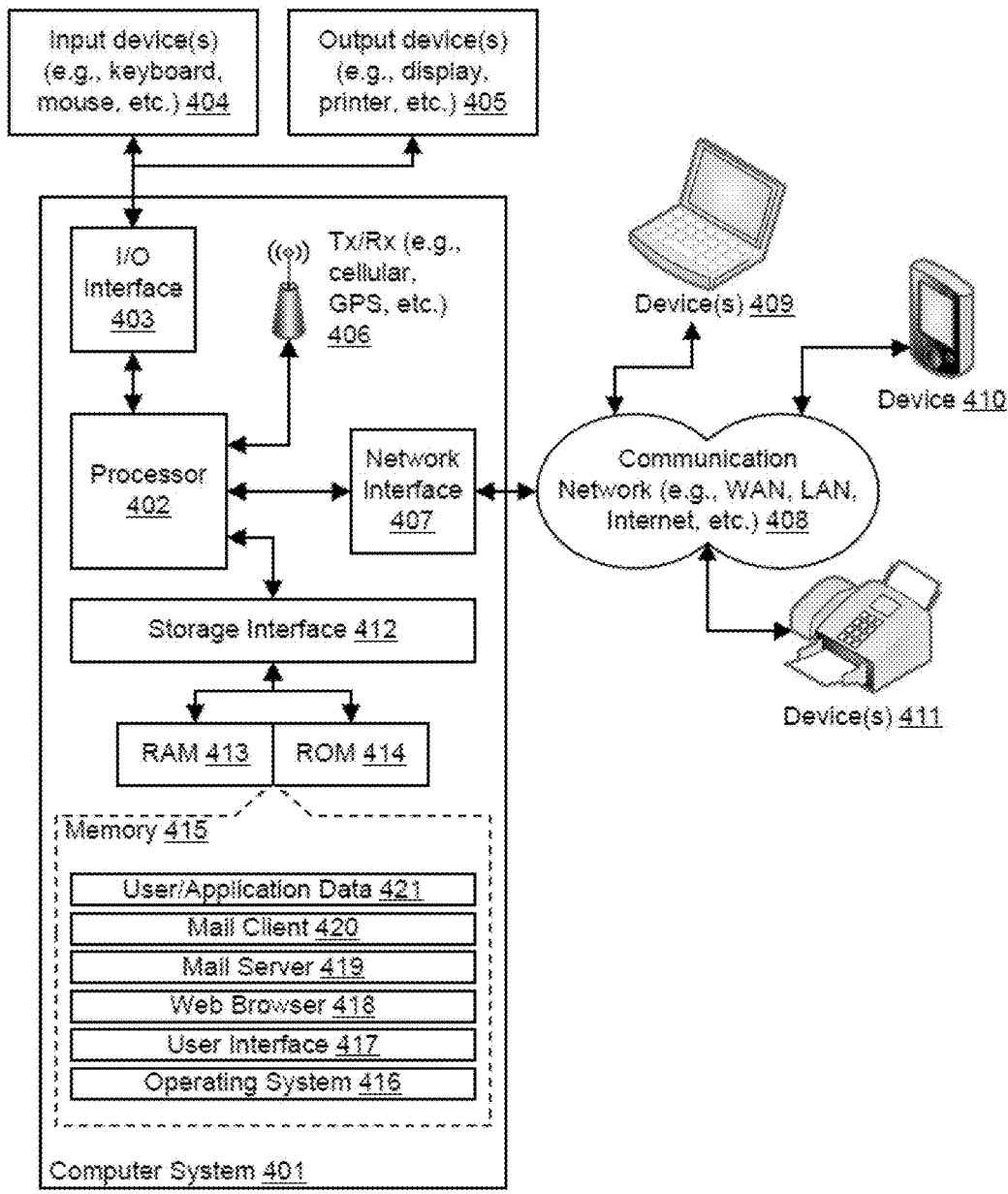
FIG. 4 is a block diagram of an exemplary computer system for implementing embodiments consistent with the present disclosure.

FIG. 4 is a block diagram of an exemplary computer system for implementing embodiments consistent with the present disclosure. Variations of computer system 401 may be used for implementing MGW 240, MGC 210, soft switch provisioning system 262 and billing system 268. Computer system 401 may comprise a central processing unit ("CPU" or "processor") 402. Processor 402 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like) etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, LEMF 136, service provider 110, MGC 210, and MGW 240.

The memory devices may store a collection of program or database components, including, without limitation, an operating system 416, user interface 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. (e.g., contact information, LI data, DTMF data, recorded call data, etc.) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

The specification has described systems and methods for improved lawful interceptions for calls involving in-band DTMF signaling. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

REFERRAL NUMERALS

| Reference Number | Description |
| --- | --- |
| 100 | System for identifying faulty communication call |
| 101 | Service Provider |
| 102 | MGC |
| 104 | MGW |
| 106 | Signaling Gateway |
| 108 | EMS/NMS |
| 110 | Billing System |
| 112 | PSTN/PLMN |
| 200 | Media gateway controller (MGC) System |
| 210 | MGC |
| 240 | Media Gateway (MGW) |
| 212 | Provisioning Interface |
| 214 | Measurements, statistics, alarm, event logger subsystem |
| 218 | Media Gateway Interface |
| 222 | Signaling Subsystem |
| 224 | Charging subsystem |
| 226 | Routing, Session Management & Control |
| 228 | Other sub-systems |
| 242 | Signal/External Interface Subsystem |
| 244 | Provisioning interface |
| 252 | In-band signaling subsystem |
| 254 | Media internetworking subsystem |
| 256 | Transcoding subsystem |
| 258 | Voice band subsystem |
| 260 | Other subsystems |
| 262 | Soft switch provisioning system - MGW |
| 266 | Soft switch provisioning system- MGC |
| 268 | Billing system |
| 401 | Computer System |

-continued

| Reference Number | Description |
| --- | --- |
| 402 | Processor |
| 403 | I/O Interface |
| 404 | Input device(s) (e.g., keyboard, mouse, etc.) |
| 405 | Output device(s) (e.g., display, printer, etc.) |
| 406 | Tx/Rx (e.g., cellular, GPS, etc.) |
| 407 | Network Interface |
| 412 | Storage Interface |
| 413 | Random Access Memory (RAM) |
| 414 | Read-Only Memory (ROM) |
| 416 | Operating System |
| 417 | User Interface |
| 418 | Web Browser |
| 419 | Mail Server |
| 420 | Mail Client |
| 421 | User/Application Data |
| 409, 410, 411 | Device(s) |

We claim:

1. A method for identifying faulty communication call, the method being performed by a media gateway controller and comprising:

generating communication call record information for a communication call upon determining that the communication call has been released on a signaling plane;

determining whether a message associated with the communication call has been exchanged between the media gateway controller and a media gateway within a pre-defined time interval;

receiving from the media gateway, in response to determining that no message has been exchanged between the media gateway controller and the media gateway, a notification indicating that resources for the communication call are active on a media plane in the media gateway;

responsive to receiving the notification, transmitting, to the media gateway, a request for information related to media activity of the communication call on the media plane after the communication call has been released on the signaling plane;

receiving, from the media gateway, the requested information; and identifying, by the media gateway controller, the faulty communication call based on the communication call record information and the requested information.

2. The method as claimed in claim 1, wherein the communication call record information comprises at least one of: a duration of the communication call, a timestamp associated with the release of the communication call, a reason for the release of the communication call, one or more events occurred before or during the release of the communication call, historical information on media terminations, and information about users involved in the communication call.

3. The method as claimed in claim 1, further comprising generating an add-on communication call record information for the generated call record information.

4. The method as claimed in claim 3, wherein the add-on communication call record information comprises duration of the communication call and media resources used for the communication call after the release of the communication call.

5. The method as claimed in claim 1, wherein the information about media activity of the communication call comprises at least one of: timestamp of recent valid media exchange between calling and called users, information being currently transferred on the media plane and status information of the valid media exchange.

6. The method of claim 1, wherein identifying the faulty communication call based on the communication call record information and the requested information comprises:
responsive to determining that the communication call continues on the media plane after the communication call is released on the signaling plane, identifying the communication call as faulty.

7. The method of claim 6, wherein determining that the communication call continues on the media plane comprises excluding at least one of: comfort noise, parked tone, and one or more tones not used for communication.

8. The method of claim 6, wherein determining that the communication call continues on the media plane comprises detecting, based on the communication call record, whether the communication call ends with an announcement.

9. The method of claim 6, wherein determining that the communication call continues on the media plane comprises determining whether an event related to at least one of: a disconnection, an outage, an alarm, or a congestion event occurs at the media gateway.

10. The method of claim 6, wherein determining that the communication call continues on the media plane comprises determining whether one or more digits were dialed before the communication call was released on the signal plane.

11. A media gateway controller for identifying faulty communication call, comprising:
a processor; and
a memory communicatively coupled to the processor, wherein the memory stores processor-executable instructions, which, on execution, causes the processor to:
generate communication call record information for a communication call upon determining that the communication call has been released on a signaling plane;
determine whether a message associated with the communication call has been exchanged between the media gateway controller and a media gateway within a pre-defined time interval;
receive from the media gateway, in response to determining that no message has been exchanged between the media gateway controller and the media gateway, a notification indicating that resources for the communication call are active on a media plane in the media gateway;
responsive to receiving the notification, transmit, to the media gateway, a request for information related to media activity of the communication call on the media plane after the communication call has been released on the signaling plane;
receive, from the media gateway, the requested information; and
identify the faulty communication call based on the communication call record information and the received information.

12. The media gateway controller as claimed in claim 11, wherein the communication call record information comprises at least one of: a duration of the communication call, a timestamp associated with the release of the communication call, a reason for the release of the communication call, events occurred before and during the release of the communication call, historical information on media terminations, and information about users involved in the communication call.

13. The media gateway controller as claimed in claim 11, wherein an add-on communication call record information is generated for the generated communication call record information.

14. The media gateway controller as claimed in claim 13, wherein the add-on communication call record information comprises duration of the communication call and media resources used for the communication call after the release of the communication call.

15. The media gateway controller as claimed in claim 11, wherein the information about media activity of the communication call comprises at least one of: timestamp of recent valid media exchange between calling and called users, information being currently transferred on the media plane, and status information of the valid media exchange.

16. A non-transitory computer readable medium including instructions stored thereon that, when processed by at least one processor of a media gateway controller, cause the media gateway controller to perform operations comprising:
generating communication call record information for a communication call upon determining that the communication call has been released on a signaling plane;
determining whether a message associated with the communication call has been exchanged between the media gateway controller and a media gateway within a pre-defined time interval;
receiving from the media gateway, in response to determining that no message has been exchanged between the media gateway controller and the media gateway, a notification indicating that resources for the communication call are active on a media plane in the media gateway;
responsive to receiving the notification, transmitting, to the media gateway, a request for information related to media activity of the communication call on the media plane after the communication call has been released on the signaling plane;
receiving, from the media gateway, the requested information; and
identifying, by the media gateway controller, the faulty communication call based on the communication call record information and the requested information.

17. The medium as claimed in claim 16, wherein the communication call record information comprises at least one of: a duration of the communication call, a timestamp associated with the release of the communication call, a reason for the release of the communication call, events occurred before and during the release of the communication call, historical information on media terminations, and information about users involved in the communication call.

18. The medium as claimed in claim 16, wherein the operations further comprise generating an add-on communication call record information for the generated call record information.

19. The medium as claimed in claim 18, wherein the add-on communication call record information comprises duration of the communication call and media resources used for the communication call after the release of the communication call.

20. The medium as claimed in claim 16, wherein the information about media activity of the communication call comprises at least one of: timestamp of recent valid media exchange between calling and called users, information being currently transferred on the media plane, and status information of the valid media exchange.

* * * * *